April 30, 1940.  A. BORZYM  2,198,599

CUT-OFF MECHANISM

Filed June 28, 1937  5 Sheets-Sheet 1

INVENTOR.
ALEXANDER BORZYM.
BY
Geo. B. Pitts
ATTORNEY.

April 30, 1940.　　A. BORZYM　　2,198,599
CUT-OFF MECHANISM
Filed June 28, 1937　　5 Sheets-Sheet 2

INVENTOR.
ALEXANDER BORZYM.
BY　Geo. B. Pitts
ATTORNEY.

April 30, 1940.   A. BORZYM   2,198,599
CUT-OFF MECHANISM
Filed June 28, 1937    5 Sheets-Sheet 5

INVENTOR.
ALEXANDER BORZYM.
BY
ATTORNEY.

Patented Apr. 30, 1940

2,198,599

UNITED STATES PATENT OFFICE 2,198,599

CUT-OFF MECHANISM

Alexander Borzym, Detroit, Mich., assignor to The Yoder Company, Cleveland, Ohio, a corporation of Ohio Application June 28, 1937, Serial No. 150,697

11 Claims. (Cl. 164—49)

This invention relates to a machine for automatically cutting strips of material into predetermined lengths. While invention has been applied to the cutting of metal strips, as herein shown, and such illustration and the following description are for the purpose of disclosing the preferred embodiment and application of the invention, it is not to be limited to any particular kind of material, furthermore, the strips may be of composite construction. The strips may be of any desired shape in cross section, that is, flat or preformed, one example thereof being shown in the accompanying drawings.

One object of the invention is to provide an improved machine of this character which operates automatically and accurately, in a rapid manner, to cut the work into predetermined lengths.

Another object of the invention is to provide an improved machine of this character wherein its operations are positively controlled and the lock and release devices for the actuating member are relatively simple.

Another object of the invention is to provide an improved machine of this character wherein the mechanism for operating the cutter is arranged to impart a quick power stroke to the latter, while moving with the work, whereby large capacity results and the machine may be adapted to cut the work into sections of any desired length.

A further object of the invention is to provide a machine incorporating certain improvements in the construction disclosed in my co-pending application filed Feb. 9, 1934, Serial No. 710,430 now Patent No. 2,155,396, whereby the machine is materially simplified and the power of the cutting stroke increased.

Other objects of the invention will be apparent to those skilled in the art to which my invention relates from the following description taken in connection with the accompanying drawings, wherein.

Figure 3:
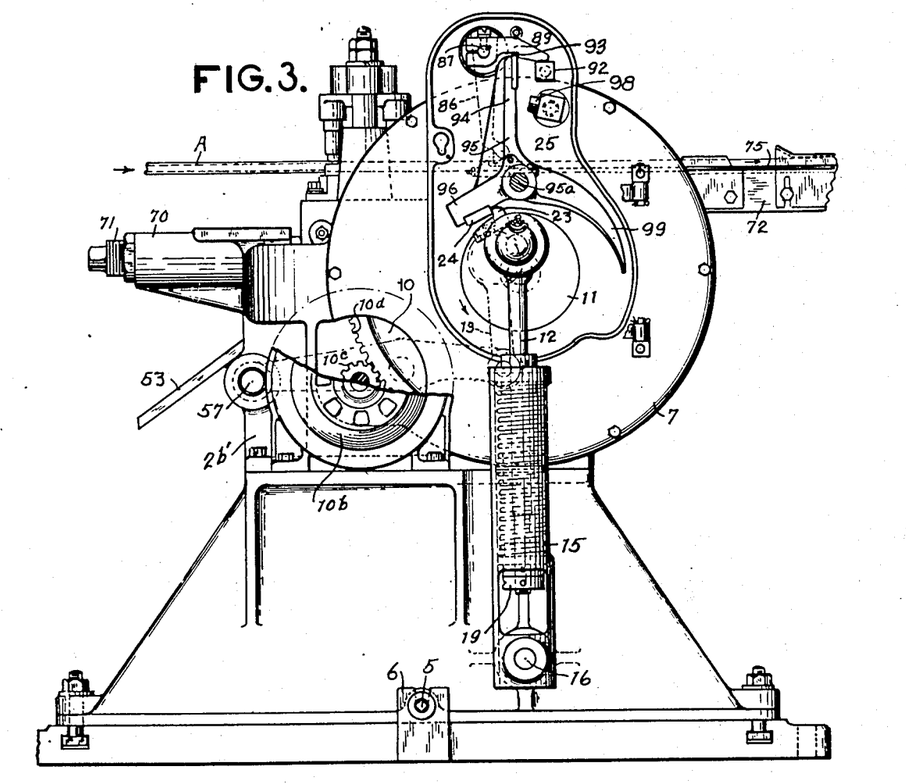
Fig. 3 is a fragmentary side elevation of the machine on that side opposite to the side shown in Fig. 1, with parts omitted and broken away.
Figure 4:
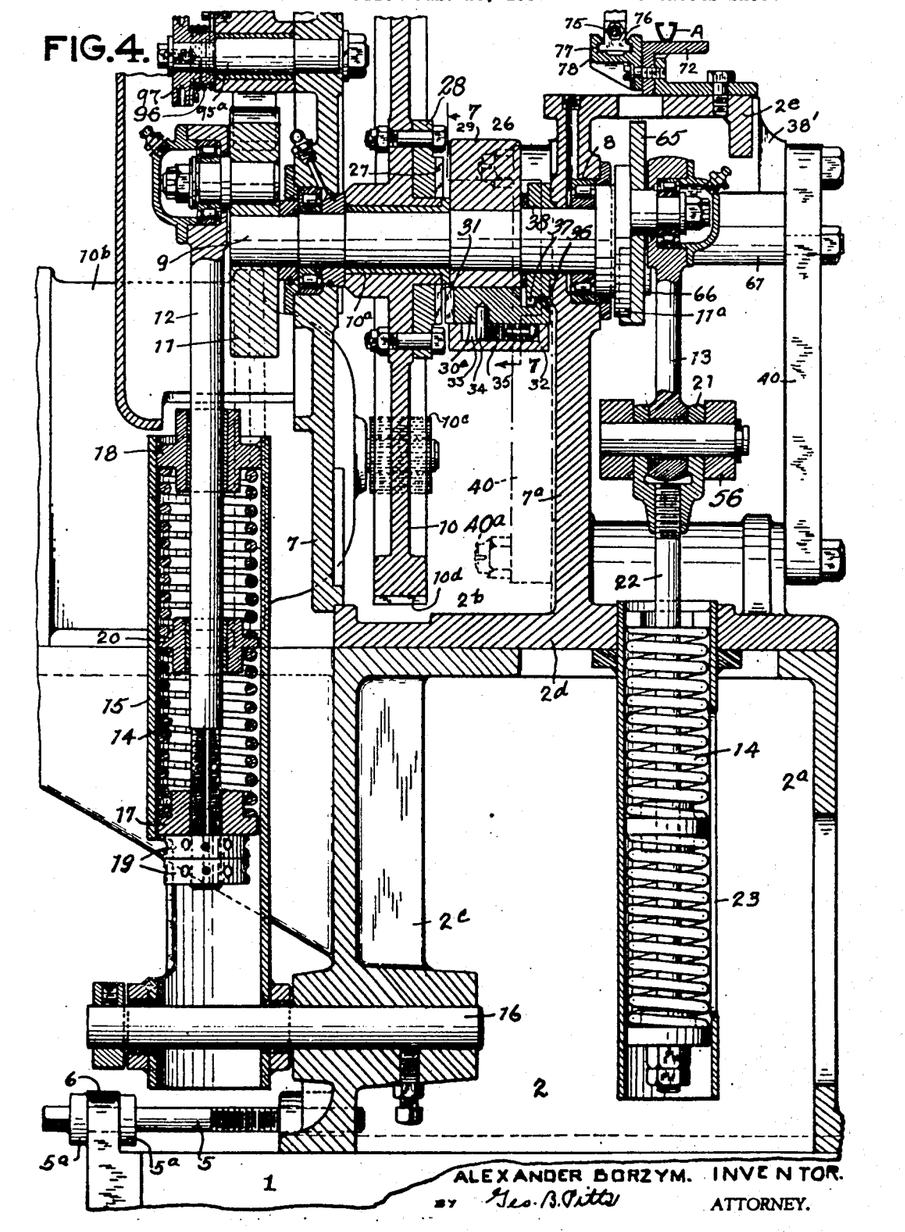
Figs. 4 and 5 are sections on the lines 4—4 and 5—5, respectively of Fig. 1.

In the drawings, 1 indicates a bed or basal member on which is adjustably mounted a frame, indicated as an entirety at 2. The frame 2 is secured to the bed 1 by bolts 3, the heads of which slidably fit T-slots 4 formed in the bed 1 to permit adjustment of the frame 2 and all parts and mechanisms carried thereby transversely to the feed of the work A. The adjustment of the frame 2 is preferably effected by a screw 5, having threaded engagement with a portion of the frame 2, the screw 5 being rotatably mounted in a lug 6 on the bed 1 and provided with collars 5a, which engage the lug 6, to prevent endwise movement of the screw 5 when it is rotated. The frame 2 comprises a lower section 2a and an upper section 2b having integral and separate portions related and connected to support the parts and elements hereinafter referred to. The upper section 2b includes walls 7, 7a (the latter being suitably bolted to walls of the section 2b), provided with alined seats for suitable anti-friction bearings 8, in which is mounted an actuating member 9. 10 indicates a fly wheel rotatably mounted on a bushing 10a, which surrounds the actuating member 9, and adapted to be connected to the actuating member 9 through a portion of its cycle of movement, as later set forth. The fly wheel 10 is continuously driven by an electric motor 10b, the shaft thereof being provided with a gear 10c which meshes with the gear teeth 10d on the periphery of the fly wheel; but it will be understood that the fly wheel may be driven in any desired manner. The motor 10b, and fly-wheel and the gearing for driving the latter by the motor is referred to herein as the main power mechanism. The actuating member 9 consists of a shaft having secured thereto, preferably on the opposite outer sides of the walls 7, 7a, crank disks 11, 11a, to which are connected pitmans 12, 13, respectively. The pitmans 12, 13, are operated in one direction by power springs 14, 14, respectively, which are loaded or reset, and then released to start the actuating member 9 with a strong impulse and to rotate the latter through a portion of its cycle to effect the cutting stroke of the cutter. The connection of the pitmans 12, 13, with the crank disks 11, 11a, are preferably at different angular positions; that is, when the springs are set and locked, the pivot points between the pitmans 12, 13, and crank disks 11, 11a, respectively, are at one side of the axis of the actuating member, but at different angular positions about the axis thereof, as shown in Fig. 3. In this arrangement, upon release of the springs, one spring supplements the other spring in sustaining the maximum rotative effort on the actuating member and to insure its operation through a long portion of its cycle. Each crank disk 11, 11a, is provided with a crank pin which rotates in suitable anti-friction bearings seated in the ends of the pitmans 12, 13. The pitman 12 extends into a cylinder 15, the outer or lower end of which is pivoted on a stud shaft 16, fixedly mounted in the adjacent wall 2c of the frame section 2a (see Fig. 4). At its free end, the pitman 12 is provided with a head 17 between which and an annular abutment 18 fixed to the cylinder 15 at its inner end, is a coil spring 14. The spring 14 is compressed or loaded when the actuating member is rotated by the main power mechanism to the position shown in Figs. 1 and 3. The head 17 is adjustably fixed to the pitman 12 by a pair of nuts 19 threaded on the outer end portion thereof. The spring 14 preferably comprises two sections having between them a guide device 20 which slides on the pitman; this arrangement being provided to overcome the danger of buckling which would be present in the use of a single spring under compression. The pitman 12 is guided by the abutment 18 and the engagement of the head 17 with the inner walls of the cylinder 15, the pivotal mounting for the latter permitting it to oscillate due to the movement of the pitman 12.

The pitman 13 is pivotally connected to a yoke 21 provided on the upper end of a rod 22. The rod 22 extends into a cylinder 23 fixedly supported in the wall 2d of the frame section 2b. The rod 22 is spring operated and guided in a manner similar to the pitman 12, as will be apparent from Fig. 4.

The spring operated mechanism above described, when released, is arranged to start the rotative movement of the actuating member 9 and through it and the driving mechanism for the cutter (which mechanism is later described), to effect a cutting stroke upon the work A, whereas the main power mechanism, which includes the fly wheel 10, is connected to the actuating member 9 immediately following its rotative movement under the influence of the spring operated mechanism; that is, after the springs 14 have expended their power, the main power mechanism serves to rotate the actuating member to its initial position and to re-load the springs. The main power mechanism is then disconnected from the actuating member 9, this disconnection following the re-loading of the springs 14 and preceding the engagement of a lug 23 on the periphery of the crank disk 11 with a release element 24 of a lock and release means indicated as an entirety at 25. The actuating member 9 will remain in this position, locked against operation, until the element 24 is disengaged from the lug 23. Upon such disengagement, the spring operated mechanism will rotate the actuating member 9, which in turn will effect reconnection of the main power mechanism therewith. The connection and disconnection of the main power mechanism with the actuating member 9 is controlled by the angular position of the latter, in co-ordinated relation with the operation of the actuating member by the springs 14 and the loading and re-setting of the springs 14 and operation of the lock and release means, by a clutch means, indicated as an entirety at 26. Of the clutch means 26, 27 indicates an annular series of teeth provided on a ring 28 suitably fixed to the inner side of the fly wheel 10. 29 indicates an annulus surrounding the actuating member 9 and pressed on or keyed thereto. At one side the annulus is formed with a transverse guide way 30 to slidably receive a block 30a provided at one end (its left hand end as viewed in Fig. 4) with a tooth 31 adapted to engage with the teeth 27 when the block is moved endwise toward the left. The block 30a is held in its guide-way 30 by a plate 32 suitably bolted to the side wall of the annulus. The plate 32 is recessed as shown at 33 to accommodate a pin 34 projecting from the block 30a and a coil spring 35 interposed between the pin 34 and outer end wall of the recess 33, the spring normally tending to slide the block 30a toward the left and effect engagement of its tooth 31 with the teeth 27 to lock the fly wheel and actuating member 9 together. At its opposite or right hand end, the block 30a is provided with an extension having on its free end an off-set or lug 36 arranged to engage a cam 37. The cam 37 comprises a wall preferably formed integral with a collar 38 surrounding the actuating member 9 and suitably fixed to the wall 7a. The wall or cam 37 is beveled at its opposite ends and is arranged to be engaged by the lug 36, as the latter rotates with the annulus 29 and to move the block 30a toward the right, as viewed in Fig. 4, to disengage the tooth 31 from the teeth 27. The cam 37 is arranged to effect this disengagement after the springs are re-loaded but prior to the arresting and locking of the actuating member by the engagement of the lug 23 with the element 24, and to permit engagement of the tooth 31 with the teeth 27 after the springs 14 have effected the cutting stroke, so that the main power mechanism may continue the rotation of the actuating member 9 through the remaining portion of its cycle, whereby the springs 14 are re-loaded and re-set ready for the succeeding cutting stroke or operation. In the form of construction above described, the spring power mechanism is arranged to effect the cutting stroke and the main power mechanism is arranged to pick up the actuating member, that is, become connected to it automatically during its cycle of rotative movement and to continue its rotation to re-load the springs and effect or permit the re-locking of the actuating member under the influence of the springs. However, by slight modifications of the form of construction, as later set forth, both the spring operated mechanism and main power mechanism may be connected to the actuating member 9 to effect the cutting stroke. 38' indicates a support over which the work A is fed and provided with elements, dependent on the cross sectional shape of the work, arranged to co-operate with the cutter, whereby the latter operates effectively, to cut the work into sections successively. The support 38' is mounted on pairs of parallel links 40, pivoted at their lower ends on pins 40a, which are mounted in upstanding walls on the wall 2b. The links 40 permit the support to be reciprocated, as later set forth, so that in its movement in the direction of feed of the work (see arrow in Fig. 1) the support 38' moves therewith. The cutter 39 is suitably mounted on a plate 41 carried by a cross head 42, which is fixed to a pair of guide rods 43. The guide rods 43 are slidably mounted in guides 44 and reciprocated therein by a driving mechanism indicated as an entirety at 45. The guides 44 comprise tubular members preferably formed integrally with the support 38' (see Fig. 5).

Figures 5, 6, 13:
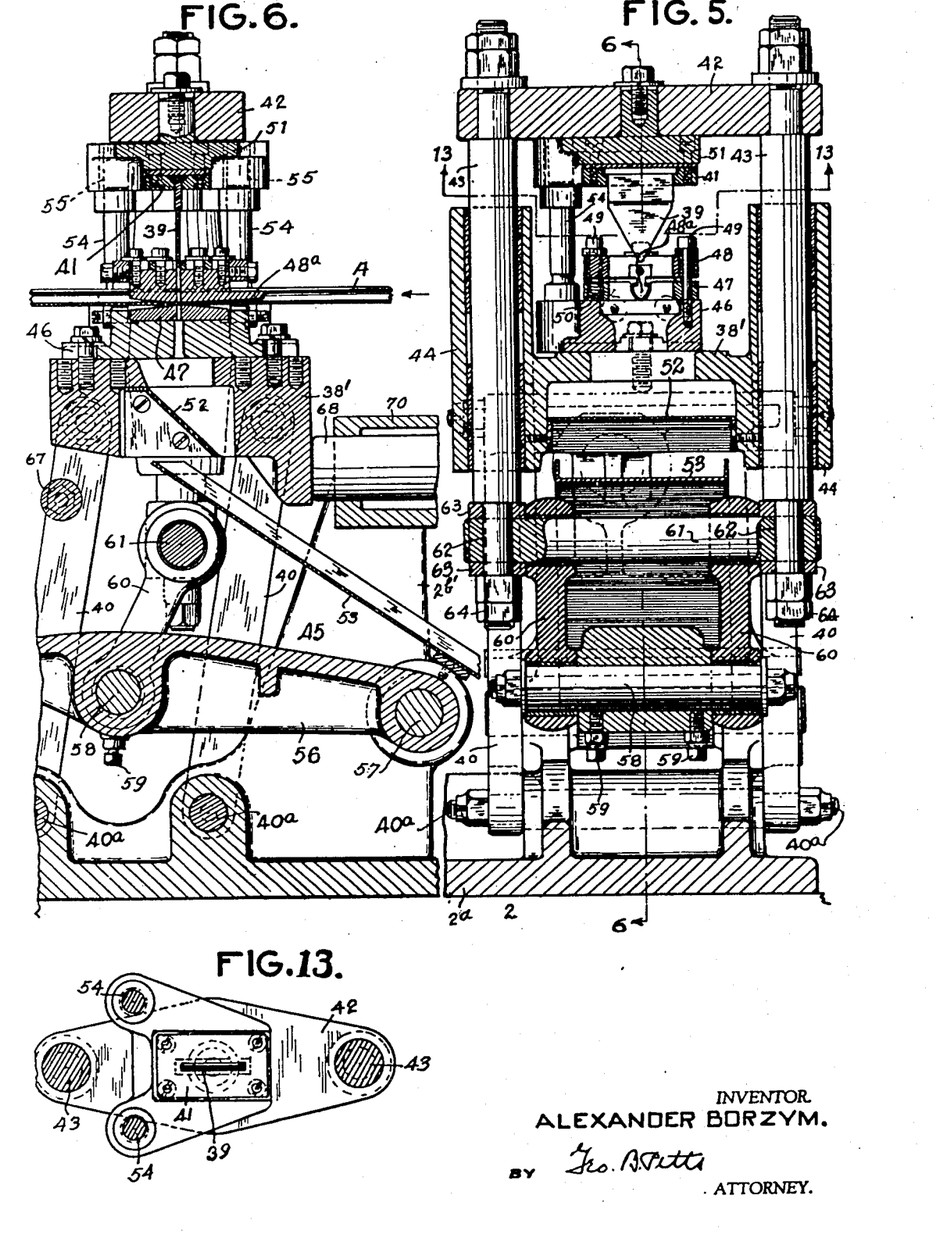
Fig. 6 is a section on the line 6—6 of Fig. 5.
Fig. 13 is a section on the line 13—13 of Fig. 5.

In the form of construction shown, the work is fed to and through a die structure mounted on a block 46 which is suitably secured to the support 38' (see Fig. 6). The die structure comprises a lower member 47 and an upper member 48 having related walls forming a space between them substantially similar in cross section to the work, as shown in Fig. 5. The upper member 48 is mounted to move relative to the lower member 47, within predetermined limits so that the related walls between them will accommodate the work when fed into the die structure and slight variations in the work. For this purpose, the lower member 47 is provided with a plurality of pins 49 which extend through openings formed in the upper member 48, the pins forming guides for the upper member and the heads thereof serving to limit the movement of the member 48 away from the member 47. The upper member 48 is normally maintained at the upper limit of its movement by a plurality of coil springs 50 (only one being shown) mounted in openings formed in the lower member 47. The cutter 39 is seated in the plate 41, which is removably bolted to a base 51, the latter in turn being secured to the cross head 42. The guide pins 49 may be adjusted to regulate the limit of movement of the upper member 48. The cutter 39 when moving downwardly first engages with the upper edges of the work A and these edges being in overlapping engagement with the mandrel 48a carried by the upper die member 48 force the latter member downwardly in the further movement of the cutter and the mandrel in turn forces the work against the die walls in the lower member 47, following which movement the cutter 39 severs the work. The cutter 39 is provided with a double cutting edge, which co-acts with the edges of the lower die member and mandrel 48a, as shown in Fig. 6, to make a shear cut through the work. As shown in Figs. 5 and 6, the block 46 and support 38' are formed with openings below the die structure to permit the sheared-off portions of the work to gravitate onto a guard 52 which guides them to a discharge shute 53. 54 indicates lead pins mounted in the block 46 and arranged to fit openings 55 formed in the base 51 (see Fig. 6).

From the foregoing description it will be noted that the work support 38', reciprocatable cross head 42, die structure and cutter 39 constitute a unitary assembly capable of movement about the pivots 40a for the lower ends of the links 40, such movement being co-ordinated with the operation of the cutter 39 in making the cutting strokes, as later set forth.

The driving mechanism 45 for the cross head 42 comprises the following: 56 indicates a link pivoted on a pin or shaft 57 which is mounted at its opposite ends in bosses provided on spaced upstanding walls 2b' formed integrally with the frame section 2b. The link 56 is bifurcated at its forward end so as to straddle the yoke 21 to which the bifurcations are pivotally connected by the pin which pivotally connects the yoke and link 13 together, whereby the power mechanisms employed to rotate the actuating member 9 are utilized to swing the link 56 about the axis of the shaft 57. Intermediate its ends, the walls of the link 56 are thickened to form a bearing for a shaft 58, fixed to the walls of the link by one or more set screws 59. The opposite ends of the shaft 58 project beyond the lateral sides of the link and have connected to them the lower ends of links 60. The upper ends of the links 60 are pivoted on a cross shaft 61 fixedly mounted on the lower ends of the guide rods 43, and serve to transmit the movement of the link 56 to the rods 43, whereby the cross head 42 is reciprocated. As shown in Fig. 5, the lower ends of the guide rods 43 are reduced to form shoulders and such reduced ends extend through openings 62 formed in the cross shaft 61 and the latter is clamped between washers 63 by nuts 64 against these shoulders.

The support 38' and parts carried thereby are reciprocated by the following instrumentalities so that during the cutting stroke the cutter and die structure move with and at the same speed as the work; 65 indicates a cam having fixed relation to the actuating member 9, being suitably secured to the crank disk 11a. The cam 65 engages roller 66 mounted on a shaft 67 the ends of which are fixedly supported on the adjacent links 40. The cam 65 is removably connected to the crank disk and is shaped to control the movement of the support in co-ordinated relation with the feed of the work and movement of the cutter. The roller 66 is maintained in engagement with the cam 65, so as to follow its contour or path, by a plunger 68 held normally in engagement with the support 38' by a spring 69, the spring permitting the plunger to retract when the cam 65 through the roller 66 and links 40 moves the support rearwardly. The plunger 68 is slidably mounted in a barrel 70, preferably formed integrally with the up-standing walls 2b', and is of hollow form to accommodate the spring 69, which is disposed between the inner end wall of the plunger 68 and a plug 71 threaded into the outer end of the barrel 70, the adjustment of the plug serving to regulate the tension of the spring. As the cam 65 is in fixed relation to the actuating member 9 and rotates therewith, it operates to control the reciprocations of the support 38' in co-operation with the cycle of movement of the actuating member 9.

Figures 1, 14, 15:
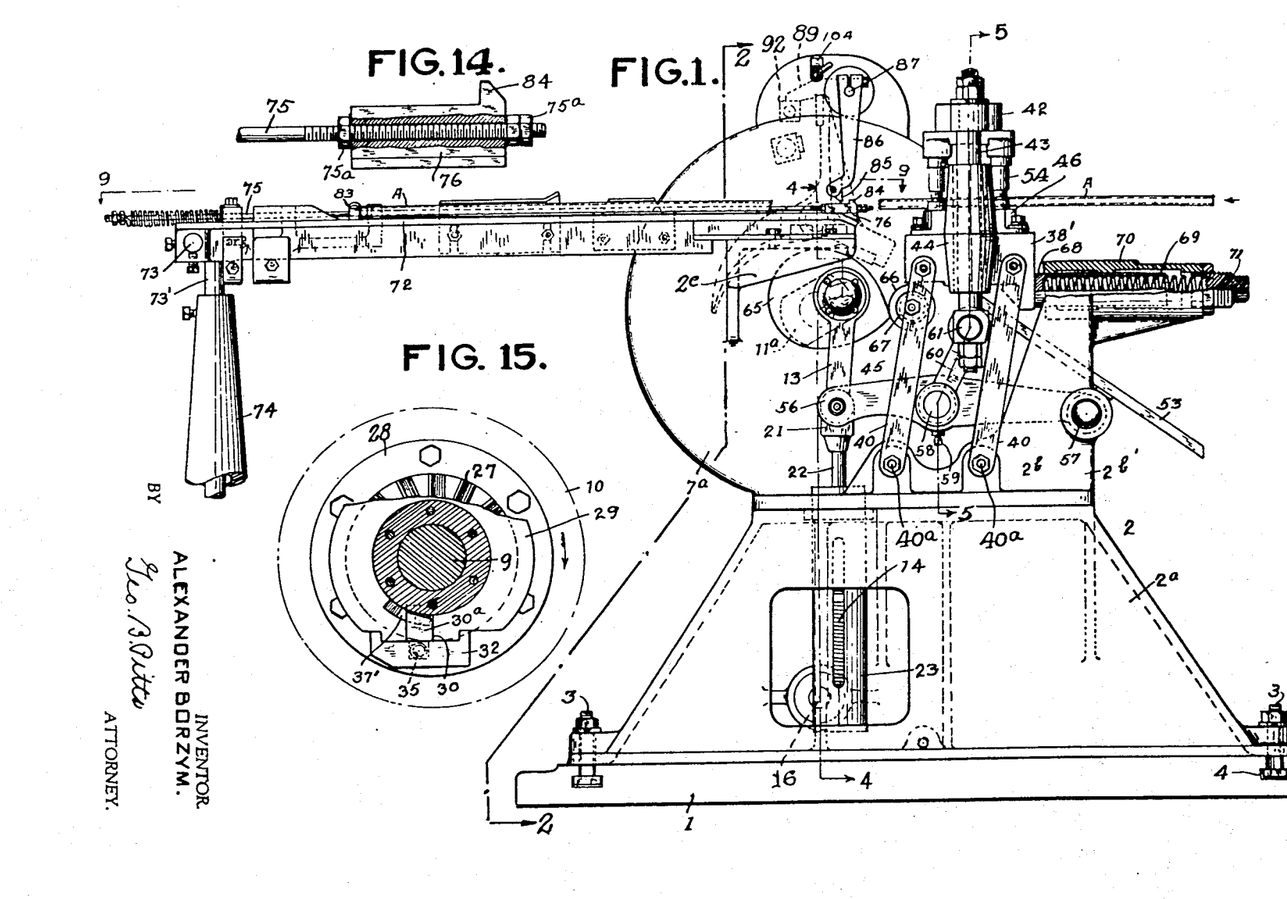
Fig. 1 is a side elevation of a machine embodying my invention.
Fig. 14 is a fragmentary detail view (enlarged) parts being broken away.
Fig. 15 is a section similar to Fig. 7, but showing a modified form of construction.
Figures 2, 7, 8:
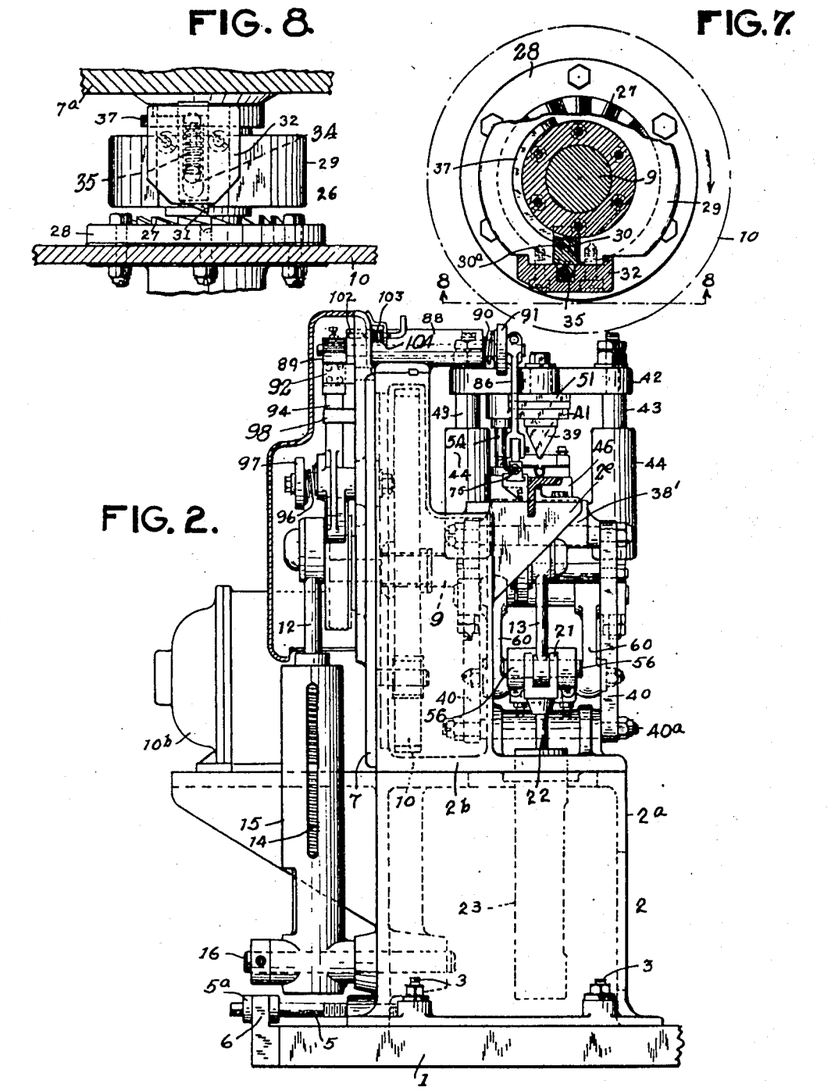
Fig. 2 is a section on the line 2—2 of Fig. 1.
Fig. 7 is a section on the line 7—7 of Fig. 4.
Fig. 8 is a section on the line 8—8 of Fig. 7.
Figures 9, 10, 11, 12:
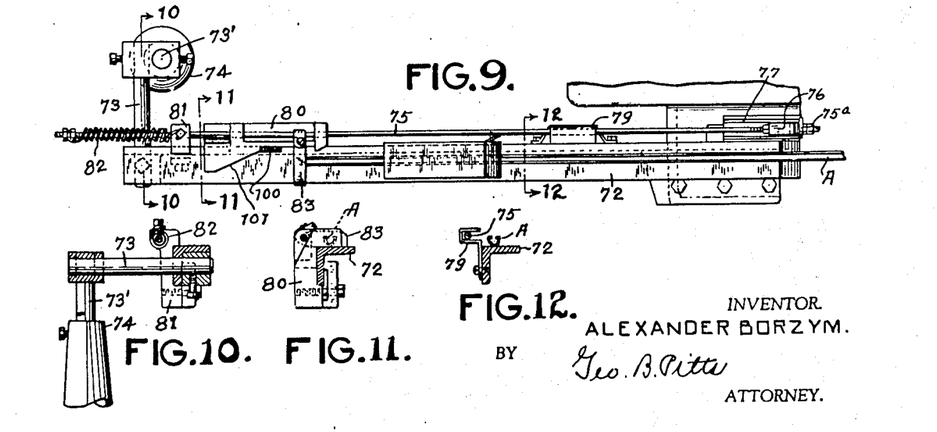
Fig. 9 is a fragmentary plan view substantially on the line 9—9 of Fig. 1.
Figs. 10, 11 and 12 are sections on the lines 10—10, 11—11 and 12—12, respectively, of Fig. 9.

The lock and release mechanism 25 is arranged to be actuated by the work A; that is, by the leading end of the work after each section is cut off and to permit its re-locking with the springs 14 loaded when the actuating member 9 in its cycle of movement arrives at its initial position. As the shaft 9 approaches this position and after the pivots for the pitmans 12, 13, have passed their dead center positions, the main power mechanism, due to the operation of the cam 37, is disconnected from the actuating member 9, so that the latter may be arrested and locked against movement. Also, and by preference, the mechanism 25 operates to discharge each section of the work after it is cut off. To carry out these operations, I provide the following: 72 is a table connected to and supported at one end by an overhanging wall 2e formed integrally with the wall 1a, the opposite end of the table being supported on an arm 73 carried at the upper end of a rod 73' which is adjustable in a suitable standard 74. 75 indicates a rod rotatably connected at its inner end to a slide 76, as shown in Fig. 14. The slide 76 is guided in ways 77 provided in a bracket 78, the bracket being secured to the side wall of the table 72 (see Fig. 4). The rod 75 is supported and guided by a plurality of devices 79, 80 and 81 suitably fixed to the table 72 at spaced positions thereon. The outer end of the rod 75 has connected to it a spring 82 which is connected to the device 81, the spring normally tending to move the rod 75 and slide 76 toward the right as viewed in Figs. 1 and 9. 83 indicates a flag fixed to the rod 75 and arranged in the path of movement of the work A, and operating by the engagement of the work therewith to move the rod 75 and slide 76 toward the left, such movement serving to release the locking element 24 from the lug 23, as will be understood from the following description: the outer end of the slide 76 is provided with a striker 84 arranged to engage a dog 85 on the free end of a lever 86, the dog 85 being pivoted on the lever and held against movement in one direction but free to swing in the opposite direction so as to ride the striker in the event the latter moves beyond the dog in operating the lever 86. The lever 86 is fixed to one end of a shaft 87 which is mounted in a bearing 88 carried by the wall 7. The opposite end of the shaft 87 has fixed to it a trigger 89. The shaft 87 is normally biased in one direction (clockwise as viewed in Fig. 3) by a spring 90, one end of the spring being secured to a collar 91 fixed to the shaft 87 and its other end being suitably fixed to the wall of bearing 88. The spring 90 serves to normally swing the trigger toward a stop 92, which limits its movement for a purpose later to be set forth. The spring 90, through the shaft 87 and lever 86, serves to maintain the dog 85 in operative relation to the striker 84. The trigger 89 is provided with a shoulder 93 with which the outer end of one arm 94 of a bell crank 95 engages, as shown in Fig. 3. When the bell crank 95 is in this position, the locking element 24 is disposed in the path of movement of the lug 23, and operates, upon engagement of the lug 23 therewith to stop the rotation of the actuating member 9. The bell crank 95 is suitably mounted on a stud shaft 95a carried by the wall 7. The bell crank arm 94 is normally held in engagement with the shoulder 93 by a spring 96 coiled around the shaft, one end of the spring being connected to a collar 97 fixed to the shaft and its other end being fixed to the bell crank and tending to swing the latter clockwise, as viewed in Fig. 3. As shown in Fig. 3, the other arm 94a of the bell crank 95 carries the release element 24, which is engaged by the lug 23, as already set forth. Fig. 3 shows the springs 14 in loaded position and the pitmans 12, 13, set for operation thereby, with the actuating member 9 locked against movement by the release element 24; and Fig. 9 shows the end of the work A in engagement with the flag 83, so that in the further movement of the work it will move the rod 75 endwise and cause the striker 84 to engage the dog 85 and swing the lever 86 (counterclockwise as viewed in Fig. 1). The lever 86 will swing the trigger 89 upwardly, thereby releasing or disengaging the shoulder 93 from the arm 94 of the bell crank 95, which, under the influence of the spring 96, will swing clockwise (as viewed in Fig. 3) into engagement with a stop 98. This operation of the bell-crank will cause disengagement of the release element 24 from the lug 23, thereby permitting the spring power mechanism to rotate the actuating member 9, as already described. The re-setting or re-locking of the actuating member 9 in its initial position by the engagement of the lug 23 with the release element 24 is effected in the following manner: it will be noted that when the bell crank 95 is released from the shoulder 93 and is swung into engagement with the stop 98, the tail member 99 of the bell crank is disposed in close relation to the periphery of the crank disk 11 and is therefore in the path of movement of the lug 23 so that the latter, as it revolves with the disk, engages with and gives the tail member a kick, the effect of which is to swing the bell crank counterclockwise, as viewed in Fig. 3, in opposition to the spring 96, so that the end of the crank arm 94 rides beyond the shoulder 93 and positions the release element 24 in the path of movement of the lug 23. As the trigger 89 is normally biased downwardly, its shoulder 93 will automatically move into position in front of the arm 94 and the latter, under the influence of the spring 96, will engage with and be locked by the shoulder and position the release element 24 in position to arrest the lug 23 and actuating member 9 in its predetermined, initial position, as shown in Fig. 3. The tail member 99 is of curvilinear shape and positioned so that the lug 23 may engage therewith and operate the bell crank in co-ordinated relation to the re-loading of the springs 14, release of the main power mechanism from the actuating member 9 and approach of the lug 23 to the release element 24.

The rod supporting device 80 is provided with cams 100, 101, the former being disposed in the path of movement of the flag 83 so as to swing it out of the path of movement of the work A after the rod 75 has been moved far enough to effect operation of the lock and release devices 25. To permit this movement of the flag, the rod 75 is rotatably mounted in the slide 76, but held against endwise movement relative thereto by nuts 75a (see Fig. 14). The rod 75 and flag 83 are returned to normal position by the spring 82, which being coiled around the rod is put under tension when the rod is moved endwise and rotated. The cam 101 is disposed beyond the cam 100 in the path of movement of the work and spaced from the flag 83 so as to be engaged by the work after it has been severed by the cutter 39, such engagement serving to deflect the cut-off section laterally to discharge it from the table 72

Fig. 15 shows a modified form of construction wherein the main power mechanism is connected to the actuating member 9 immediately following the release of the element 24 from the lug 23, so that both the spring power mechanism and the main power mechanism serve to rotate the actuating member through that portion of its cycle which effects the cutting stroke, the latter mechanism operating to re-load the spring as already described. In this form of construction, the cam, indicated at 37', serves to move the block 30a outwardly, that is, to disengage the tooth 31 from the teeth 27 carried by the fly-wheel after the springs are re-loaded and the pitmans 12, 13, have passed their dead-center positions, and to permit engagement of the tooth 31 with the teeth 27 after the release of the lug 23. In this modified form of construction it is evident that the power of the spring mechanism and that of the main power mechanism should be correlated so that the power of both may be advantageously utilized. This modified form of construction may be used to advantage where it is desirable, due to the quality of the metal of the work, to reduce the speed of the cutter to avoid overheating thereof.

102 indicates a spring operated rod carried by the wall 7 and movable endwise into position above the trigger 89 to lock it against operation so that the actuating member 9 may be held inoperative, when an operator is adjusting parts or getting the machine ready for operation. The rod 102 may be retracted in opposition to the spring 103 and rotated to position a lug on the rod rearward of a bracket 104 carried by the wall 7.

The table 72 may be of a length to accommodate the longest section of work to be cut and the parts carried thereby respectively adjusted for shorter lengths; also, the flag 83 is adjustably connected to the rod 75 and the latter may be adjusted relative to the slide 76. These adjustments enable the parts to effect and control the operations of the lock and release devices and actuating member 9.

To those skilled in the art to which my invention relates, many changes in construction and widely differing embodiments and applications of the invention will suggest themselves without departing from the spirit and scope of the invention. My disclosure and illustrations herein are purely illustrative and not intended to be in any sense limiting.

What I claim is:

1. In a machine of the class described, the combination of a supporting frame, an actuating member rotatably mounted thereon, a movably mounted work support, disposed at one side of said actuating member, a main power mechanism arranged to be connected to said actuating member for rotating it and disconnected from said member, a spring operated mechanism connected to said actuating member for rotating it through a portion of its cycle and arranged to be re-loaded by the rotation of said member when said main power mechanism is connected to said member, a cross head reciprocatably mounted on said work support and provided with a cutter for cutting the work when said cross head is moved in one direction, a link pivoted on said frame and operatively connected to said actuating member for oscillating said link about its pivot, a link between said first mentioned link and said cross head for reciprocating the latter, the connection between said links being at a point rearward of the plane of said cross head, means controlled by said actuating member for reciprocating said work support in co-ordinated relation to the feed of the work and reciprocations of said cross head to effect movement of said support with the work during the cutting stroke of said cutter, means controlled by said actuating member for connecting the main power mechanism thereto and disconnecting it therefrom, lock and release devices arranged to lock the actuating member against movement after the spring of said spring power mechanism has been re-loaded by said main power mechanism and the latter disconnected from said actuating member, and means actuated by the feed of the work for operating said lock and release devices.

2. In a machine of the class described, the combination of a supporting frame, an actuating member rotatably mounted thereon and provided with a crank at one end, a pitman connected to said crank, power mechanisms for rotating said actuating member, one of said mechanisms being connected to said pitman, co-ordinated means for disconnecting the other power mechanism from said member and locking it against rotation and connecting said mechanism to said member at predetermined angular positions thereof, respectively, a reciprocatable work support, a cross head reciprocatably mounted on said work support, a link pivoted on a horizontal axis to swing vertically and connected to said pitman, a separate link connected to said first mentioned link intermediate its ends and to said cross head for reciprocating the latter, co-acting cutting elements carried by said cross head and work support, means for reciprocating said work support in co-ordinated relation to the operation of said cross head to move said support with the work during each cutting operation, and means controlled by the work for releasing said locking means.

3. In a machine of the class described, the combination of a supporting frame, an actuating member rotatably mounted thereon, a work support movably mounted on said frame, a cross head reciprocatably mounted on said work support and provided with a cutter, devices for locking said actuating member in a predetermined position, power mechanisms arranged to be operatively connected to said actuating member for rotating it in co-ordinated relation to the operations of said locking devices to lock and release said member, means controlled by the movement or feed of the work to release the locking element of said locking devices, and means for reciprocating said work support to move it in one direction with the work during the cutting of the work by said cutter, said means including a cam fixed to said actuating member.

4. In a machine of the class described, the combination of a supporting frame, an actuating member rotatably mounted thereon, a work support movably mounted on said frame, a cross head reciprocatably mounted on said work support and provided with a cutter, devices for locking said actuating member in a predetermined position, power mechanisms arranged to be operatively connected to said actuating member for rotating it in co-ordinated relation to the operations of said locking devices to lock and release said member, means controlled by the movement or feed of the work to release the locking element of said locking devices, and means for reciprocating said work support to move it in one direction with the work during the cutting of the work by said cutter, said reciprocating means comprising a cam fixed to said actuating member and arranged to be engaged by a portion of said work support and a spring operated plunger engaging said work support and normally tending to maintain it in engagement with said cam.

5. In a machine of the class described, the combination of a supporting frame, an actuating member rotatably mounted thereon, a support over which work is continuously fed, a cross head arranged to be reciprocated relative to said work support and carrying a cutter for cutting the work into sections, devices, including an element revolubly carried by said actuating member, for locking it in a predetermined angular position, a power mechanism arranged to exert rotative effort on said actuating member when in said predetermined angular position, and effect rotative movement thereof upon release of said locking devices, a separate power mechanism arranged to be connected to and rotate said actuating member upon rotation thereof by said first mentioned power mechanism to another predetermined angular position, and means controlled by the feed of the work for operating said locking devices to release said actuating member.

6. A machine as claimed in claim 5 wherein said separate power mechanism operates to rotate the actuating member into said first mentioned predetermined angular position to permit the re-locking thereof by said locking devices.

7. In a machine of the class described, the combination of a supporting frame, an actuating member rotatably mounted thereof, a support over which work is continuously fed, a cross head arranged to be reciprocated relative to said work support and carrying a cutter for cutting the work into sections, devices for locking said actuating member in a predetermined position, power mechanisms arranged to exert rotative effort on said actuating member when in predetermined angular positions, in co-ordinated relation to the operations of said locking devices, said locking devices comprising a member movably mounted on said frame and having a locking element normally disposed in an inoperative position, a trigger arranged to engage said movable member and lock it in its operative position, means controlled by the feed of the work for operating said trigger to release said movable member for movement to its inoperative position, and co-acting elements, one thereof being carried by said movable member and the other element being fixed to and revolved by said actuating member, for moving said movable member into its operative position with the locking element carried thereby in the path of movement of the last mentioned element, whereby the trigger engages said movable member to lock it in its operative position and the last mentioned co-acting element engages said locking element to lock said actuating member against movement.

8. In a machine of the class described, the combination of a supporting frame, an actuating member rotatably mounted thereon, a support over which work is continuously fed, a cross head arranged to be reciprocated relative to said work support and carrying a cutter for cutting the work into sections, devices for locking said actuating member in a predetermined position, power mechanisms arranged to exert rotative effort on said actuating member when in predetermined angular positions, in co-ordinated relation to the operations of said locking devices, one of said power mechanisms being operated by a spring which is re-loaded by the other power mechanism when the actuating member is rotated thereby into position to be locked by said locking devices consisting of a lever fulcrumed on said frame and provided with a locking element and a tail member, means normally tending to move the lever in one direction to an inoperative position, a trigger arranged to lock said lever in its operative position when the latter is moved in the opposite direction and an element revolubly carried by said actuating member and arranged to first engage said tail member to move said lever into its operative position, whereby it is locked by said trigger, and to then engage said locking element to lock said actuating member against rotation, and means controlled by the feed of the work for operating said trigger.

9. In a machine of the class described, the combination of a supporting frame, an actuating member rotatably mounted thereon, a support over which work is continuously fed, a cross head arranged to be reciprocated relative to said work support and carrying a cutter for cutting the work into sections, devices for locking said actuating member in a predetermined position, power mechanisms arranged to exert rotative effort on said actuating member when in predetermined angular positions, in co-ordinated relation to the operations of said locking devices, one of said power mechanisms being operated by a spring which is re-loaded by the other power mechanism when the actuating member is rotated thereby into position to be locked by said locking devices, means controlled by the feed of the work for operating said locking devices, said means including a flag arranged to be engaged and moved by the work, and means for disengaging said flag from the work after the latter has been cut by said cutter.

10. In a machine of the class described, the combination of a supporting frame, an actuating member rotatably mounted thereon, a support over which work is continuously fed, a cross head arranged to be reciprocated relative to said work support and carrying a cutter for cutting the work into sections, devices for locking said actuating member in a predetermined position, power mechanisms arranged to exert rotative effort on said actuating member when in predetermined angular positions, in co-ordinated relation to the operations of said locking devices, one of said power mechanisms being operated by a spring which is re-loaded by the other power mechanism when the actuating member is rotated thereby into position to be locked by said locking devices, means controlled by the feed of the work for operating said locking devices, said means including a flag arranged to be engaged and moved by the work, means for disengaging said flag from the work after the latter has been cut by said cutter, and means disposed in the path of movement of the work for discharging the cut-off section.

11. In a machine of the class described, the combination of a supporting frame, an actuating member rotatably mounted thereon, a support over which work is continuously fed, a cross head arranged to be reciprocated relative to said work support and carrying a cutter for cutting the work into sections, means for locking said actuating member against movement, releasing said member and re-locking it, power mechanisms arranged to exert rotative effort on said actuating member when in predetermined angular positions, in co-ordinated relation to the operations of said locking devices, said means comprising an element revolubly carried by said actuating member and a plurality of inter-engaging spring operated devices, one being arranged to be engaged by said element and normally disposed in an inoperative position and each of the remaining devices being normally disposed in operative position and one thereof being arranged to lock the first mentioned device in operative position and another one thereof being disposed in the path of movement of the work and arranged to be operated thereby to release said first mentioned device to free it from said element and a tail member carried by said first mentioned device arranged to be engaged by said revolubly mounted element, whereby said device is moved into operative position and locked by the adjacent device.

ALEXANDER BORZYM.